United States Patent
Vigil et al.

(10) Patent No.: US 9,764,776 B2
(45) Date of Patent: Sep. 19, 2017

(54) MOTOR VEHICLE ENGINE ROOM AIR AND WATER MANAGEMENT SYSTEM

(71) Applicant: Honda Motor Co., Ltd., Tokyo (JP)

(72) Inventors: Fabian J Vigil, Columbus, OH (US); Kurtis R Horner, Marysville, OH (US); Jason S Borland, Marysville, OH (US); Hirokazu Matsuura, Dublin, OH (US); Nagender Reddy Kasarla, Farmington Hills, MI (US); Kenneth M Hartlaub, Powell, OR (US)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 14/975,359

(22) Filed: Dec. 18, 2015

(65) Prior Publication Data

US 2017/0174268 A1   Jun. 22, 2017

(51) Int. Cl.
B62D 25/24 (2006.01)
B62D 25/08 (2006.01)
B62D 25/10 (2006.01)

(52) U.S. Cl.
CPC .......... *B62D 25/24* (2013.01); *B62D 25/082* (2013.01); *B62D 25/10* (2013.01)

(58) Field of Classification Search
CPC ...... B62D 25/24; B62D 25/082; B62D 25/10; B62D 25/105
See application file for complete search history.

(56) References Cited

U.S. PATENT DOCUMENTS

| | | | | |
|---|---|---|---|---|
| 3,616,871 A | * | 11/1971 | West | B62D 25/105 180/68.1 |
| 4,509,926 A | * | 4/1985 | Jacobson | B63B 35/731 114/211 |
| 5,193,636 A | * | 3/1993 | Holm | B60K 11/08 180/68.1 |
| 5,365,901 A | * | 11/1994 | Kiczek | F02F 7/006 123/195 C |
| 6,302,228 B1 | * | 10/2001 | Cottereau | B60K 11/08 180/68.1 |
| 6,401,851 B1 | * | 6/2002 | Keen | B62D 25/10 180/69.21 |

(Continued)

FOREIGN PATENT DOCUMENTS

GB    2304085 A    3/1997

*Primary Examiner* — Hau V Phan
*Assistant Examiner* — Jacob B Meyer
(74) *Attorney, Agent, or Firm* — Honda Patents & Technologies North America, LLC; Mark E. Duell

(57) ABSTRACT

An air and water management system for a motor vehicle is disclosed. The system includes an air opening allowing air to enter the engine room on a side of the motor vehicle, an engine cover covering at least one component associated with the engine of the motor vehicle, a rib extending from a top side of the engine cover creating a gutter on the engine cover between the rib and a side of the engine room, a water channel formed integrally in the engine cover adjacent and laterally inward of and parallel to the rib and including a drain longitudinally to the rear of the motor vehicle at a rearward portion of the water channel. Air entering the air opening flows over the rib and into the engine room of the motor vehicle. The rib blocks debris that enters the air opening from flowing into the engine room.

16 Claims, 8 Drawing Sheets

(56) References Cited

U.S. PATENT DOCUMENTS

| | | | | |
|---|---|---|---|---|
| 7,056,172 | B2 * | 6/2006 | Bernier | B63B 19/00 440/88 A |
| 7,147,069 | B2 * | 12/2006 | Maberry | B60K 6/48 180/165 |
| 7,213,667 | B2 * | 5/2007 | Goebert | B62D 25/10 180/68.1 |
| 7,225,542 | B2 * | 6/2007 | Chernoff | B62D 25/105 29/421.1 |
| 7,287,614 | B2 * | 10/2007 | Chernoff | B62D 25/105 180/69.2 |
| 7,581,607 | B2 * | 9/2009 | Moen | B60R 19/56 180/68.6 |
| D605,669 | S * | 12/2009 | Matsumoto | D15/31 |
| D631,489 | S * | 1/2011 | Booth | D15/31 |
| 8,191,960 | B2 * | 6/2012 | Schmitz | B62D 25/10 180/69.21 |
| 8,201,651 | B2 | 6/2012 | Salvesen et al. | |
| 8,205,699 | B2 | 6/2012 | Ohzono et al. | |
| 8,276,699 | B2 * | 10/2012 | Elhardt | B60K 11/08 180/68.6 |
| 8,303,029 | B2 * | 11/2012 | Mizuta | B62D 25/00 180/69.21 |
| 8,371,408 | B2 * | 2/2013 | Kawashiri | B62D 25/10 180/69.21 |
| 8,430,195 | B2 * | 4/2013 | Jansen | B60Q 1/0035 180/69.2 |
| D698,822 | S * | 2/2014 | Saracoglu | D15/5 |
| D709,412 | S * | 7/2014 | Mays | D12/173 |
| 8,991,902 | B2 * | 3/2015 | Wisniewski | B62D 25/105 296/187.04 |
| 9,046,063 | B2 | 6/2015 | Landgraf et al. | |
| 9,073,581 | B2 * | 7/2015 | Aoyama | B60K 13/04 |
| 9,127,658 | B2 * | 9/2015 | Koenen | F04B 17/05 |
| 9,174,682 | B2 * | 11/2015 | Schmitz | B62D 25/10 |
| 9,387,887 | B2 * | 7/2016 | Ishitobi | B62D 25/105 |
| 9,545,844 | B2 * | 1/2017 | Forty | B60K 13/02 |
| 2006/0049660 | A1 * | 3/2006 | Schaller | B62D 25/06 296/103 |
| 2006/0201727 | A1 * | 9/2006 | Chan | B62D 25/105 180/69.25 |
| 2009/0188451 | A1 * | 7/2009 | Powell, Jr. | B60K 11/06 123/41.69 |
| 2011/0115259 | A1 * | 5/2011 | Mizuta | B62D 25/12 296/193.11 |
| 2011/0203864 | A1 * | 8/2011 | Ryczek | B62D 25/10 180/69.24 |
| 2013/0065499 | A1 * | 3/2013 | Patterson | B60H 1/26 454/152 |
| 2014/0070569 | A1 | 3/2014 | Schmitz et al. | |
| 2016/0096505 | A1 * | 4/2016 | Ikeda | B60R 21/34 296/193.11 |
| 2016/0159211 | A1 * | 6/2016 | Nakagawa | B60K 1/04 180/65.31 |

* cited by examiner

MOTOR VEHICLE ENGINE ROOM AIR AND WATER MANAGEMENT SYSTEM

TECHNICAL FIELD

The technical field is related to an engine room air and water management system for a mid-engine motor vehicle.

BACKGROUND

Mounting the engine in the middle instead of the front of a motor vehicle puts more weight over the rear tires, providing more traction and assistance to the front tires in braking. Mid-engine mounting also lessens the chance of rear-wheel lockup and entering a skid or spin out. Added weight on the rear tires may also improve acceleration on slippery surfaces. A mid-engine layout may also improve the efficiency of anti-lock brakes and traction control systems work better, by providing them more traction to control. In most motor vehicles, and in high-performance sports cars in particular, car handling requires balance between the front and rear wheels when cornering to maximize speed and corner handling. This balance is harder to achieve when the heavy weight of the engine is located far to the front or far to the rear of the motor vehicle, but may be maximized with a mid-engine placement. These performance improvements make the mid-engine layout popular with high-performance sports cars.

Other performance improvements are obtained when the heavy mass of the engine is located close to the back of the seats. This placement improves the ability of the suspension to absorb the force of bumps so the driver feels a smoother ride. In high-performance sports cars, the increased suspension efficiency allows engineers to increase performance by applying stiffer shock absorbers with little impact to the driver When the engine is not front-mounted and facing the wind, engine cooling becomes more difficult. Therefore, there is a need to direct air into the mid-engine engine room. Open vents may be applied, but there becomes a need to manage air and water in the engine room to prevent debris and water from being directed into the air intake system of the mid-engine.

APPLICATION SUMMARY

According to one aspect, an air and water management system for an engine room that houses an engine of a motor vehicle is disclosed. The system includes an air opening allowing air to enter and exit the engine room on a side of the motor vehicle, an engine cover covering at least one component associated with the engine of the motor vehicle, and a rib extending from a top side of the engine cover creating a gutter on the engine cover between the rib and a side of the engine room. Air entering and exiting the air opening flows over the rib and into the engine room of the motor vehicle. The rib blocks debris that enters the air opening from flowing into the engine room.

According to another aspect, an air and water management system for an engine room that houses an engine of a motor vehicle is disclosed. The system includes an air opening allowing air to enter and exit the engine room on a side of the motor vehicle, an engine cover covering at least one component associated with the engine of the motor vehicle, a rib extending from a top side of the engine cover creating a gutter on the engine cover between the rib and a side of the engine room, a water channel formed integrally in the engine cover adjacent and laterally inward of the rib and parallel to a longitudinal axis of the motor vehicle and including a drain longitudinally to the rear of the motor vehicle at a rearward portion of the water channel. Air entering and exiting the air opening flows over the rib and into or out of the engine room of the motor vehicle. The rib blocks debris that enters the air opening from flowing into the engine room.

According to yet another aspect, an air and water management system for an engine room that houses an engine of a motor vehicle is disclosed. The system includes an engine cover covering at least one component associated with the engine of the motor vehicle and a water channel formed integrally in the engine cover and parallel to a longitudinal axis of the motor vehicle including a drain longitudinally to the rear of the motor vehicle at a rearward portion of the water channel, the water channel further including a drain longitudinally to the rear of the motor vehicle at a rearward portion of the water channel.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
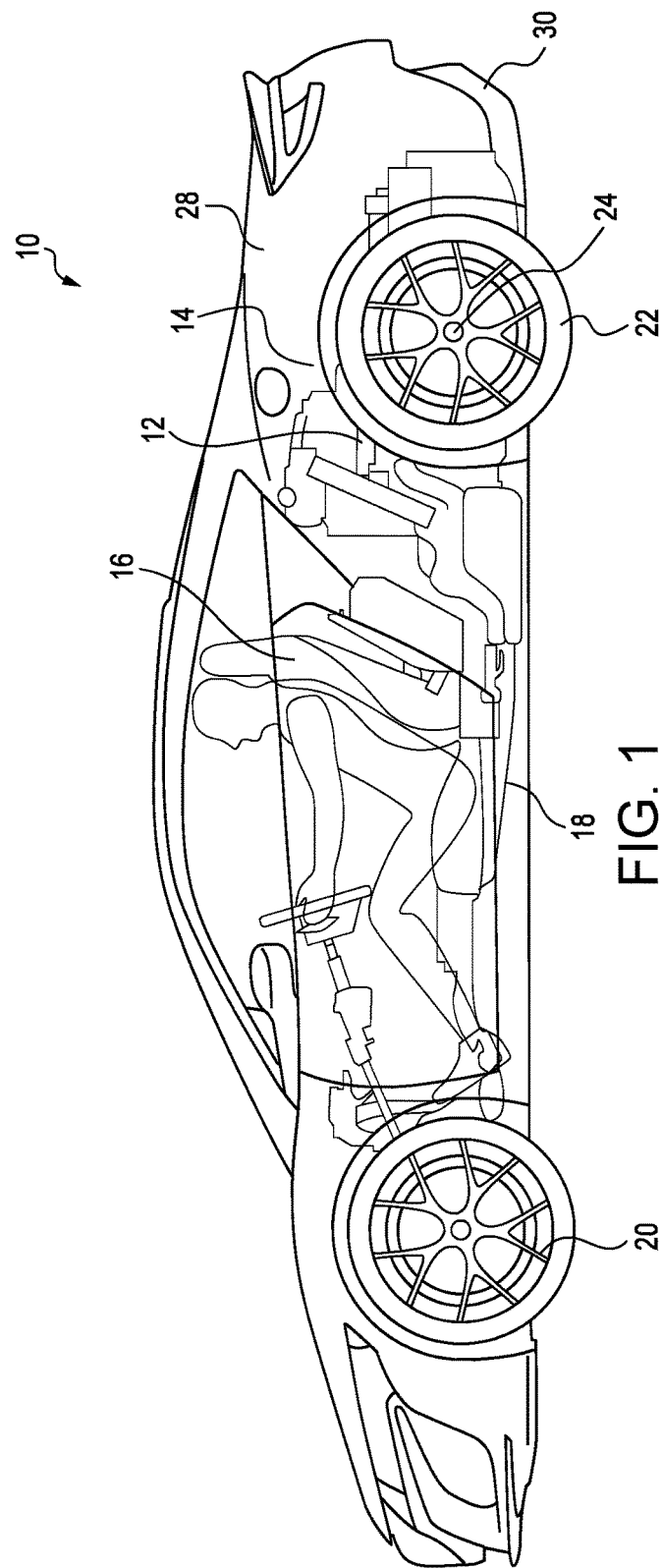
FIG. 1 is a longitudinal cross-section of a motor vehicle.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

With reference to the FIGS. 1-8, the embodiments show an air and water management system of a mid-engine motor vehicle 10. As shown in the embodiment illustrated in FIG. 1, the engine 12 of the motor vehicle 10 is located in an engine room 14 that sits behind the seats 16 on top of a frame 18 that is supported on two front wheels 20 and two rear wheels 22. In the embodiment shown in FIG. 2, the engine room 14 is located behind the seats 16 and generally longitudinally forward of and above a rear axle 24 that connects the rear wheels 22.

With the engine room 14 located behind the seats 16, there is a need to direct air into the engine room 14 to be provided to the engine 12. In the embodiment shown in FIGS. 1-2, the motor vehicle 10 includes an air opening 26 located in the upper side 28 of the body 30 adjacent the engine room 14. The air opening 26 is an opening to the engine room 14 covered by a meshed grate 32. While the meshed grate 32 prevents large debris from entering the engine room 14, the meshed grate 32 does not prevent small debris and water from entering the air opening 26.

Figure 2:
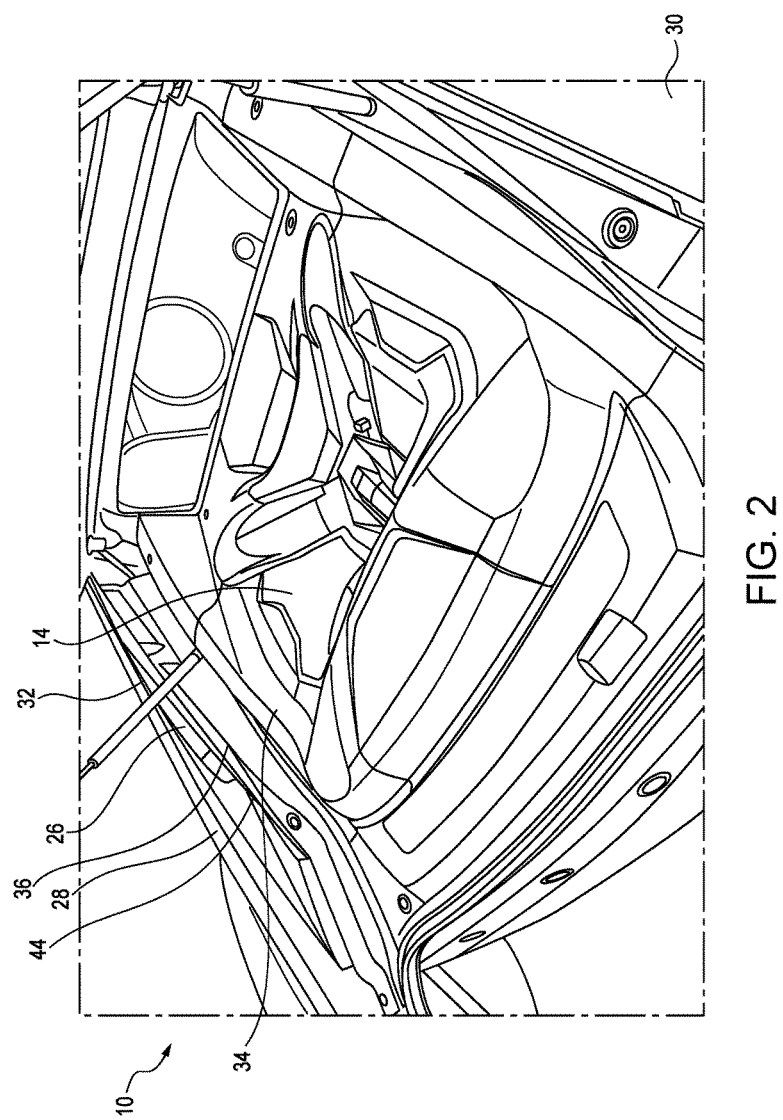
FIG. 2 is a perspective view of an engine room of the motor vehicle.

As illustrated in FIG. 2, located between the air opening 26 and the engine 12 in the engine room 14 is an engine cover 34. The engine cover 34 covers portions of the engine 12 to protect the portions of the engine 12 from being disturbed. The engine cover 34 may also provide aesthetic benefits in covering wires (not shown), belts (not shown), and other engine 12 components (not shown) from view. The engine cover 34 may preferably be constructed of plastic, aluminum, or a combination of those materials, but may also be constructed of any other suitable material known to those skilled in the art, including, but not limited to, steel, magnesium, carbon-composites, and the like.

In order to prevent water and debris from entering the engine 12 through the air opening 26, a rib 36 is formed that extends upwardly from the engine cover 34. The rib 36 acts to allow the flow of air over top of the rib 36 into the engine room 14, while blocking heavier water and debris from flowing into the engine room 14.

Figure 3:
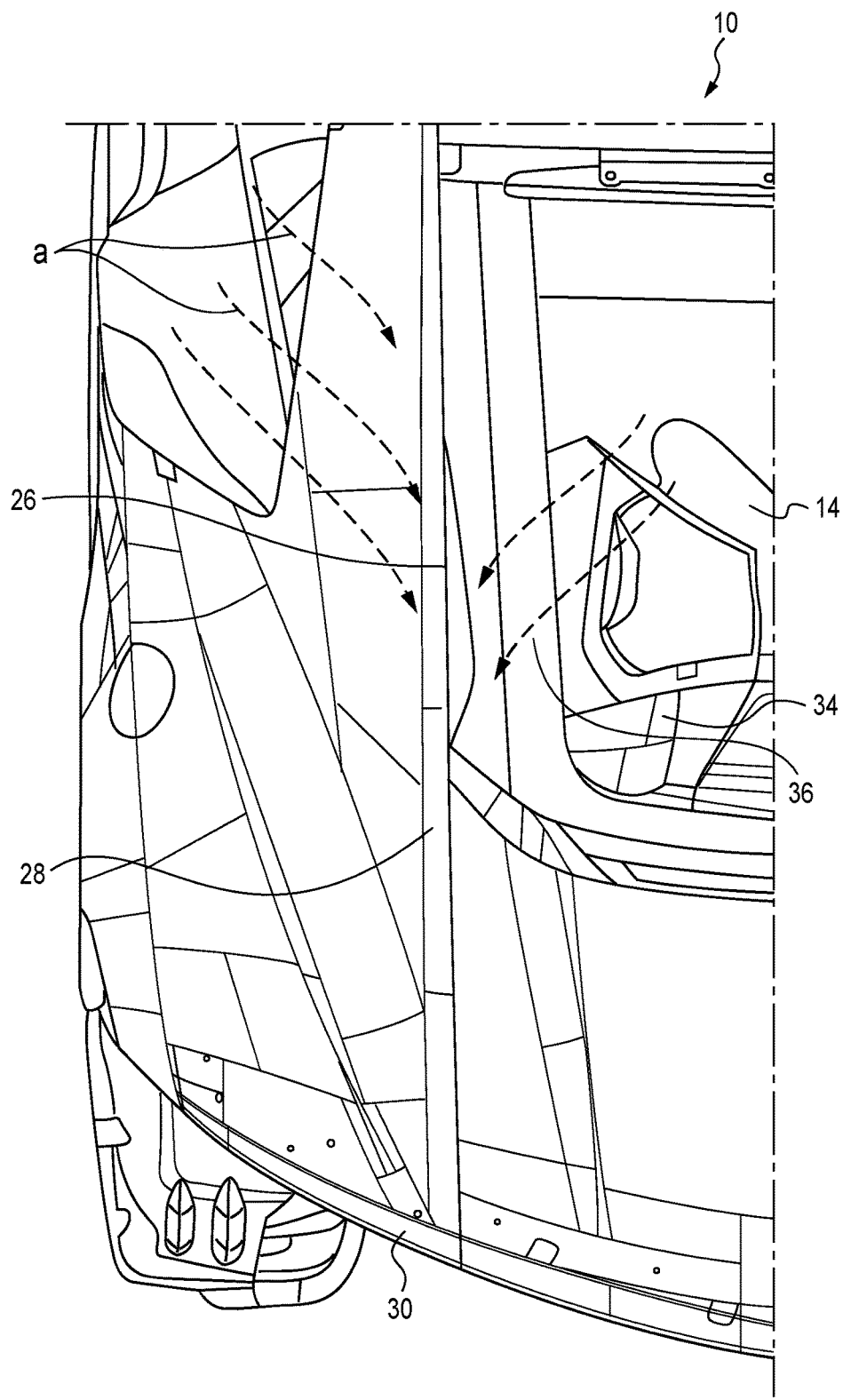
FIG. 3 is an overhead view of a portion of the rear of a motor vehicle.
Figure 4:
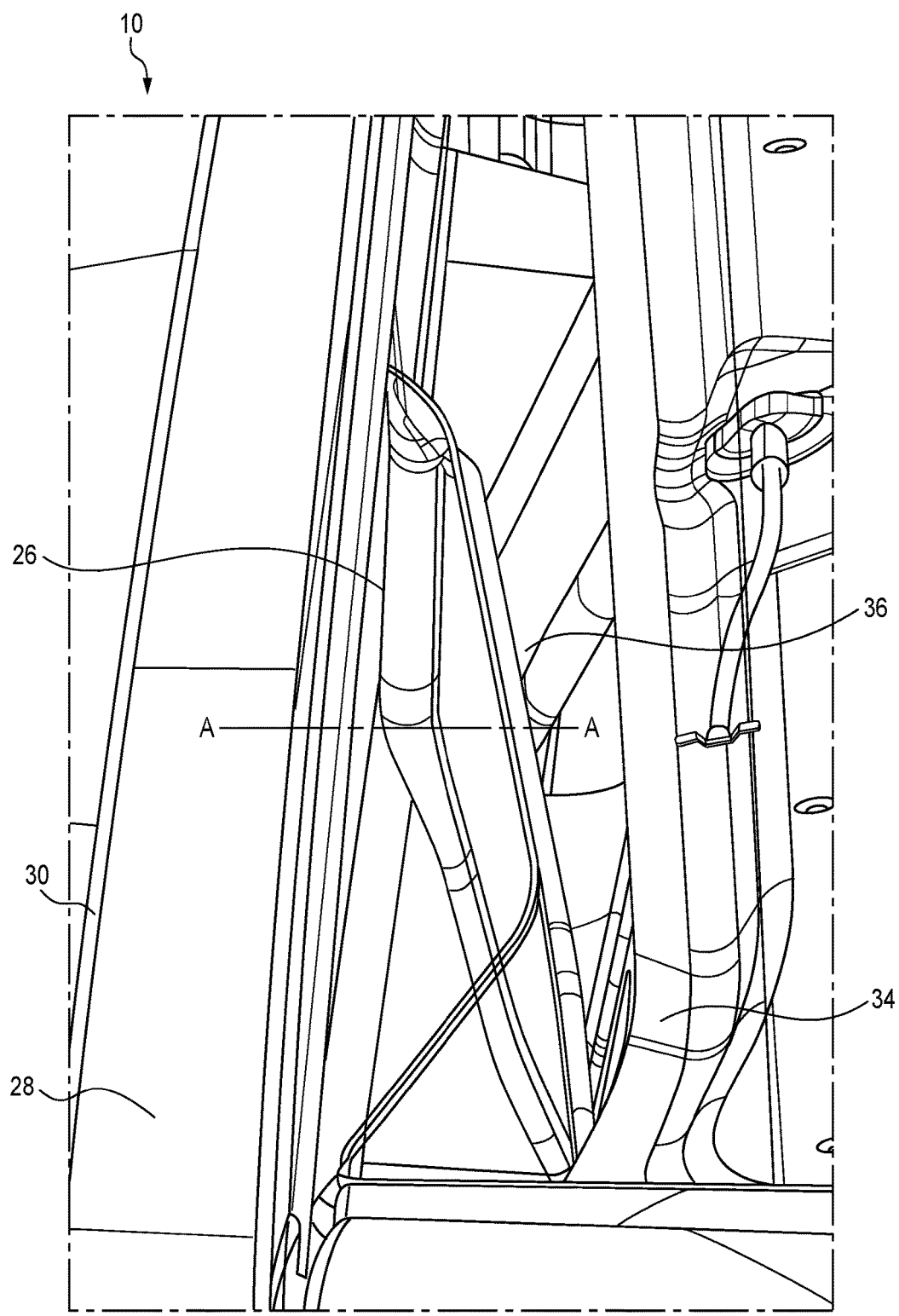
FIG. 4 is a close-up view of a portion of FIG. 3.
Figure 5:
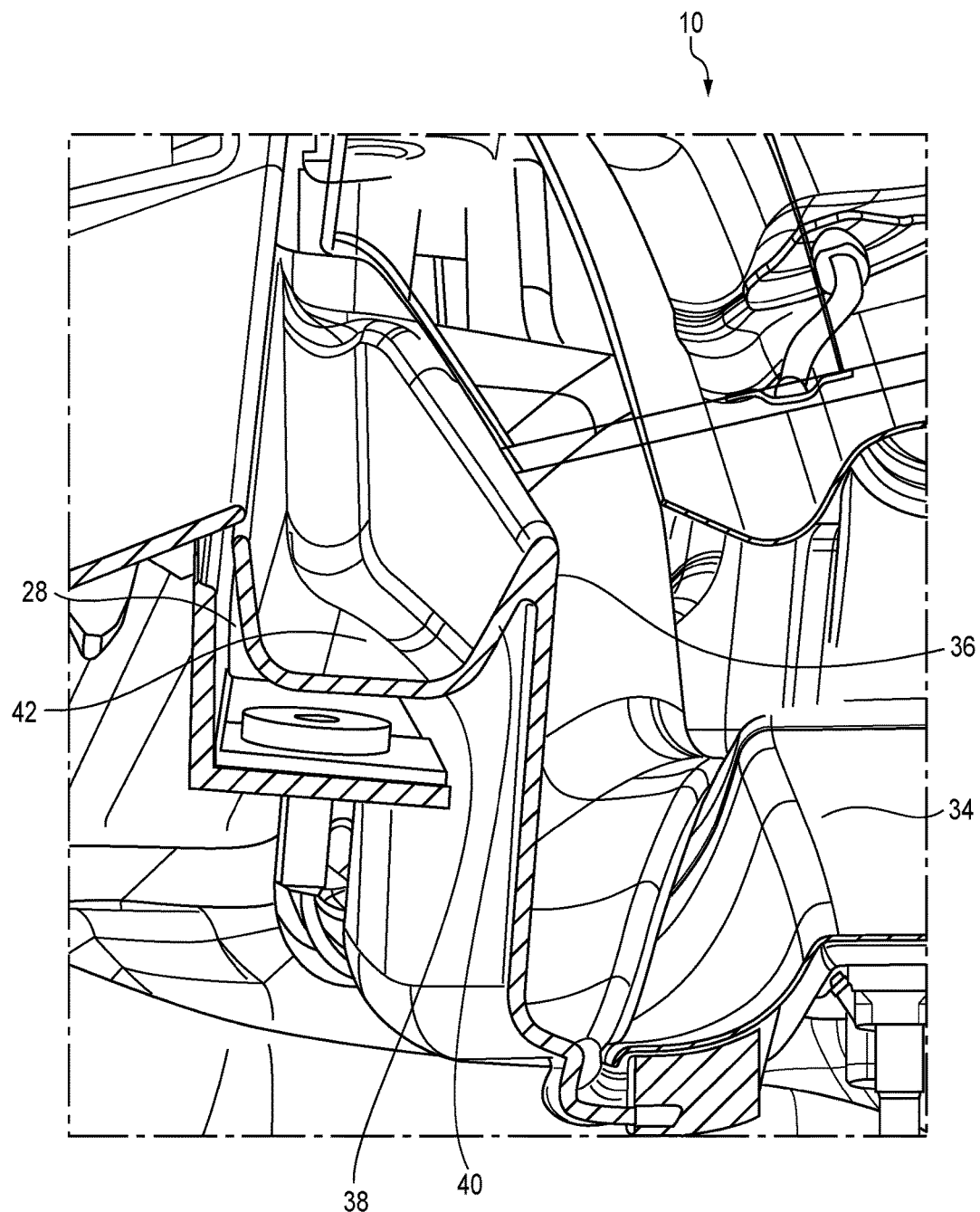
FIG. 5 is a cross-section of FIG. 4 taken along line A-A.
Figure 6:
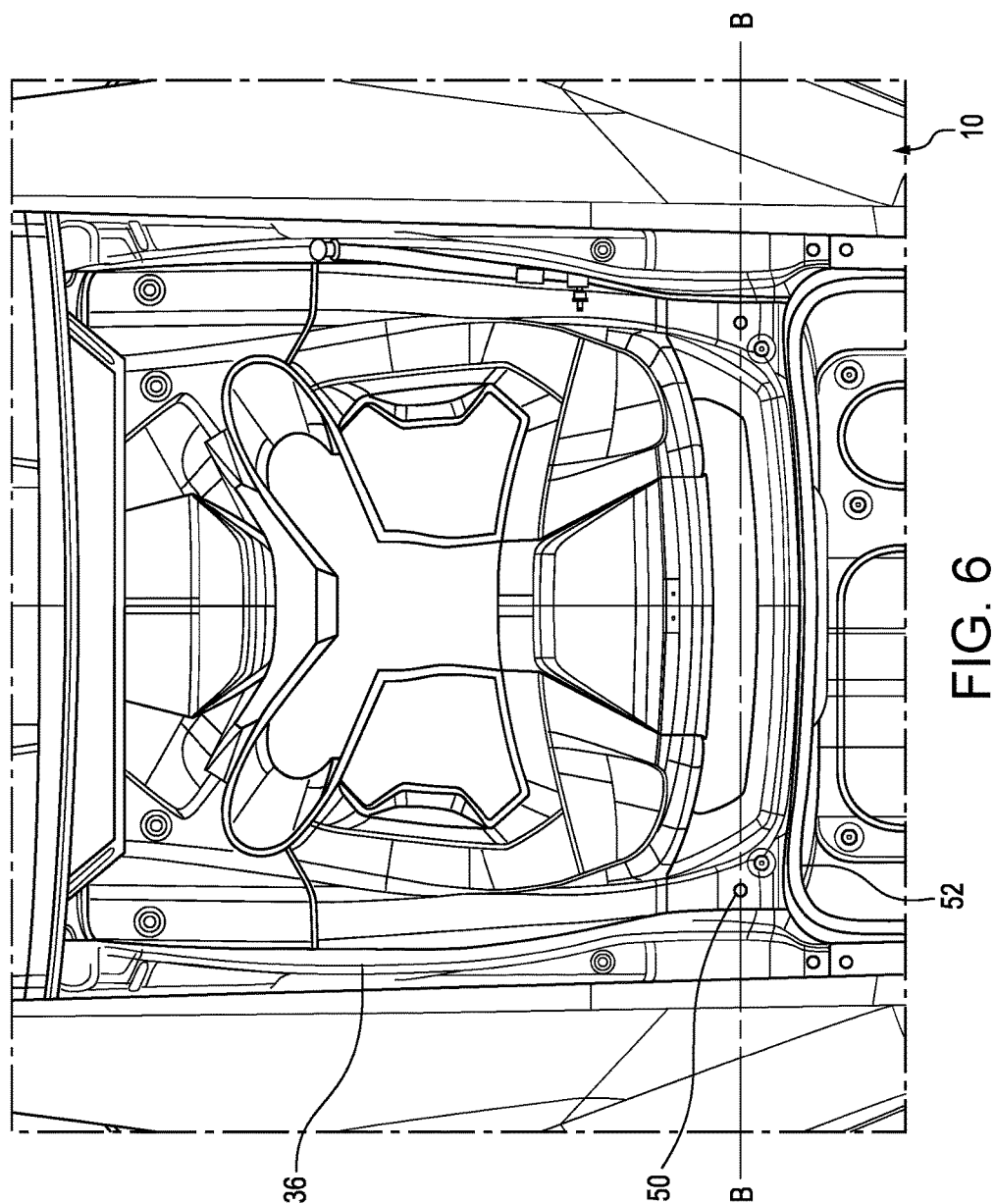
FIG. 6 is an overhead view of the engine room of a motor vehicle.
Figure 7:
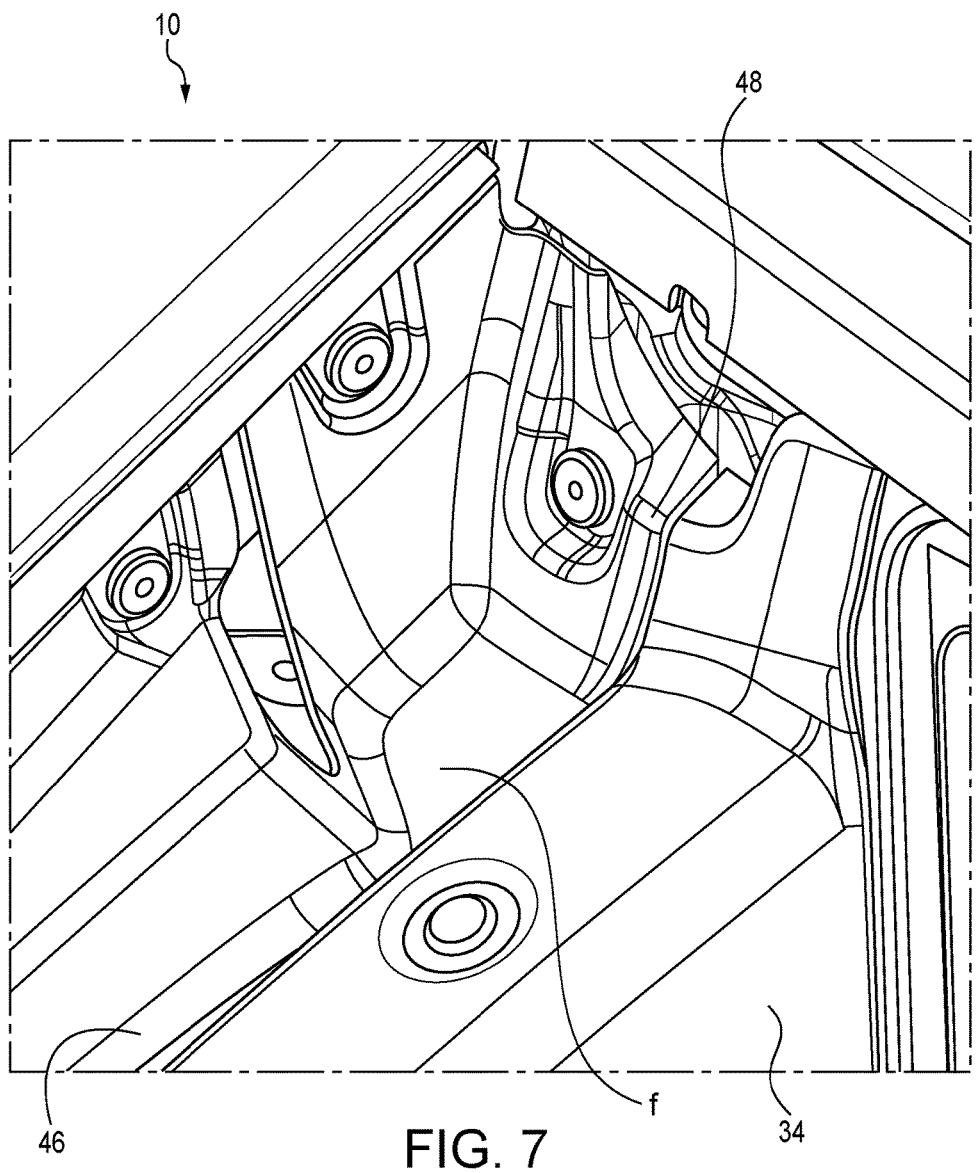
FIG. 7 is a close up perspective view of a portion of the engine room of a motor vehicle.

In the embodiment shown in FIGS. 3-5, the engine cover 34 abuts the upper side 28 of the body 30 that forms the engine room 14 of the motor vehicle 10. In the embodiment illustrated, the rib 36 gradually extends upwardly from the top 38 of the engine cover 34 forming a sloped surface 40. As illustrated in FIG. 5, the upper side 28 of the body 30, the top 38 of the engine cover 34, and the rib 36 extending upwardly from the engine cover 34 inward of the upper side 28 of the body 30 together form an U-shaped gutter 42. The gutter 42 formed, in the embodiment shown, slopes rearward in a longitudinal direction and downwardly. As shown in FIG. 2-3, as the rib 36 extends rearward, the rib 36 begins to be located laterally inward away from the upper side 28 of the body 30. As the rib 36 extends rearward, it begins to gradually recede until it meets with and merges with a water channel 46, and the gutter 42 ends.

As illustrated in FIGS. 2 and 6-8, a water channel 46 is located laterally inward of the rib 36 and extends from a longitudinally forward portion 48 of the engine cover 34, around and parallel to the gutter 42, and rearward to a first drain 50 near the rearward end 52 of the engine cover 34. As shown in FIG. 5, the inner side of the rib 36 forms the outer wall of the water channel 46 as the water channel 46 passes the gutter 42.

The water channel 46 is sloped downward from the front 48 of the engine cover 34 to rearward end 52 of the engine cover 34 to promote flow of water rearward. Water and debris carried by flowing water is directed to the first drain 50 and exits the motor vehicle 10. The flow of water is depicted by line f in FIGS. 6-8.

Figure 8:
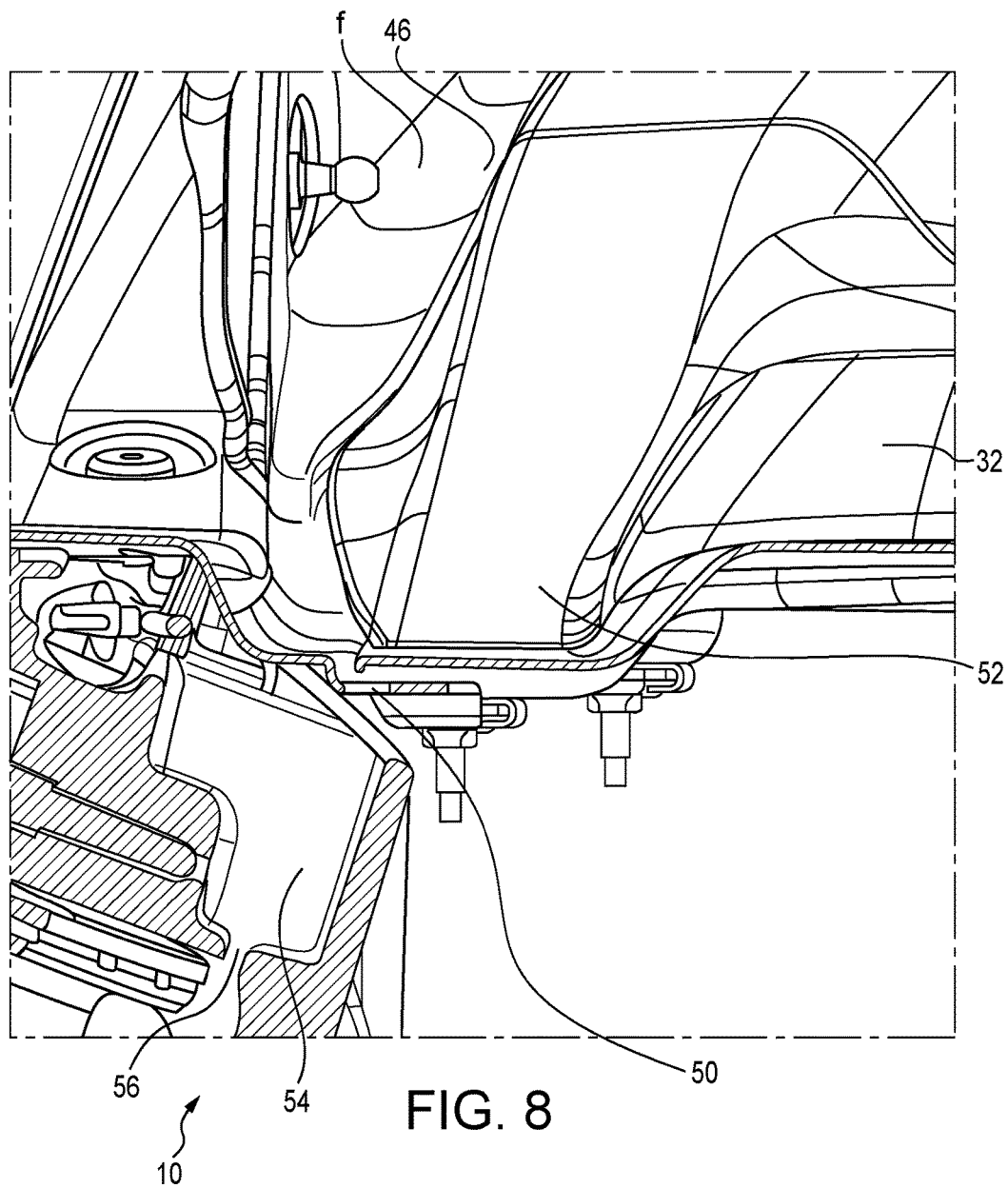
FIG. 8 is a cross-sectional rear view of a rear portion of the engine room of FIG. 6 taken along line B-B.

As shown in FIG. 8, the water that exits the first drain 50 at the rearward end 52 of the engine cover 34 is directed into a damper casting 54 in the rear of the motor vehicle 10. The damper casting 54 has second drain 56, from which the water flows out of the motor vehicle 10 to the ground.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An air and water management system for an engine room that houses an engine of a motor vehicle, comprising:
    an air opening on a side of the motor vehicle, the air opening allowing air to enter and exit the engine room;
    an engine cover located in the engine room, the engine cover covering at least a portion of the engine of the motor vehicle;
    a rib extending from a top side of the engine cover, the rib creating and defining a gutter on the engine cover between the rib and a side of the engine room;
    wherein air entering the air opening flows over the rib and into the engine room of the motor vehicle; and
    wherein the rib blocks debris that enters the air opening from flowing past the gutter and into the engine.

2. The air and water management system of claim 1 wherein the rib is integrally formed with the engine cover.

3. The air and water management system of claim 1 wherein a cross section of the gutter is U-shaped.

4. The air and water management system of claim 3 wherein the gutter slopes downwardly as the gutter extends rearward along a longitudinal axis of the motor vehicle.

5. The air and water management system of claim 4 further comprising:
    a water channel formed integrally in the engine cover, the water channel adjacent and laterally inward of the rib and parallel to a longitudinal axis of the motor vehicle.

6. The air and water management system of claim 4 further wherein the water channel further comprises a drain longitudinally to the rear of the motor vehicle at a rearward portion of the water channel.

7. An air and water management system for an engine room that houses an engine of a motor vehicle, comprising:
    an air opening on a side of the motor vehicle, the air opening allowing air to enter and exit the engine room;
    an engine cover located in the engine room, the engine cover covering at least a portion of the engine of the motor vehicle;
    a rib extending from a top side of the engine cover, the rib creating and defining a gutter on the engine cover between the rib and a side of the engine room;
    a water channel formed integrally in the engine cover, the water channel adjacent and laterally inward of the rib and parallel to a longitudinal axis of the motor vehicle, the water channel including a drain longitudinally to the rear of the motor vehicle at a rearward portion of the water channel;
    wherein air entering the air opening flows over the rib and into the engine room of the motor vehicle; and
    wherein the rib blocks debris that enters the air opening from flowing past the gutter and into the engine.

8. The air and water management system of claim 7 wherein the rib is integrally formed with the engine cover.

9. The air and water management system of claim 7 wherein a cross section of the gutter is U-shaped.

10. The air and water management system of claim 9 wherein the gutter slopes downwardly as the gutter extends rearward along a longitudinal axis of the motor vehicle.

11. The air and water management system of claim 9 wherein the gutter slopes downwardly as the gutter extends rearward along a longitudinal axis of the motor vehicle.

12. An air and water management system for an engine room that houses an engine of a motor vehicle, comprising:
   an engine cover located in the engine room, the engine cover covering at least a portion of the engine of the motor vehicle;
   a water channel formed integrally in the engine cover and parallel to a longitudinal axis of the motor vehicle, the water channel including a drain longitudinally to the rear of the motor vehicle at a rearward portion of the water channel;
   an air opening on a side of the motor vehicle, the air opening allowing air to enter and exit the engine room; and
   a rib extending from a top side of the engine cover, the rib creating and defining a putter on the engine cover between the rib and a side of the engine room.

13. The air and water management system of claim 12 wherein air entering the air opening flows over the rib and into the engine room of the motor vehicle and wherein the rib blocks debris that enters the air opening from flowing past the gutter and into the engine.

14. The air and water management system of claim 13 wherein the water channel is adjacent and laterally inward of the rib.

15. The air and water management system of claim 14 wherein the rib is integrally formed with the engine cover.

16. The air and water management system of claim 15 wherein a cross section of the gutter is U-shaped.

* * * * *